(12) United States Patent
Plaxton

(10) Patent No.: US 7,712,447 B2
(45) Date of Patent: May 11, 2010

(54) NOISE ATTENUATION FOR INTERNAL COMBUSTION ENGINE

(75) Inventor: Sheldon K Plaxton, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/365,355

(22) Filed: Feb. 4, 2009

(65) Prior Publication Data

US 2010/0089357 A1 Apr. 15, 2010

Related U.S. Application Data

(63) Continuation-in-part of application No. 12/251,692, filed on Oct. 15, 2008.

(51) Int. Cl.
*F02M 35/10* (2006.01)
(52) U.S. Cl. .................... 123/184.53; 181/224; 181/229
(58) Field of Classification Search ............ 123/184.53, 123/184.61; 181/224, 229, 270; 251/118, 251/127
See application file for complete search history.

(56) References Cited

U.S. PATENT DOCUMENTS

| | | | |
|---|---|---|---|
| 1,305,174 A | 5/1919 | Smith |
| 1,865,677 A | 7/1932 | Cheyney |
| 2,030,391 A | 2/1936 | Ott |
| 2,430,841 A | 11/1947 | Wulfhorst |
| 2,639,230 A | 5/1953 | Lefebre |
| 2,704,504 A | 3/1955 | Wilkening |
| 2,721,791 A | 10/1955 | Lim |
| 2,942,683 A | 6/1960 | Moyer |
| 3,120,876 A | 2/1964 | Lirette |
| 3,238,955 A | 3/1966 | Lassiter |
| 3,265,372 A | 8/1966 | Bradley |
| 3,454,128 A | 7/1969 | Nopper |
| 3,458,297 A | 7/1969 | Anderson |

(Continued)

FOREIGN PATENT DOCUMENTS

CA 971446 7/1995

(Continued)

OTHER PUBLICATIONS

Nakase, Kanehara and Ohara, "Flow Noise Reduction Upon Quick Opening the Throttle", Proceedings of the 2001 Noise and Vibration Conference, Apr. 20-May 3, 2001, SAE Int.

(Continued)

*Primary Examiner*—Noah Kamen
(74) *Attorney, Agent, or Firm*—Reising Ethington P.C.

(57) ABSTRACT

A component, such as an intake manifold or a throttle body, has an air passage. A structure may extend into the air passage so that the structure intersects a part of a total air-flow passing through the air passage. The structure may have a first through-hole and a second through-hole. Each of the through-holes define a cross-sectional area that may tapers in a direction of air-flow that is passing through the air passage so that a cross-sectional area of an entrance of the respective through-hole is greater than a cross-sectional area of an exit of the respective through-hole. The structure helps attenuate acoustic noise that may occur in the component due to the air-flow.

3 Claims, 3 Drawing Sheets

U.S. PATENT DOCUMENTS

| | | |
|---|---|---|
| 3,544,290 A | 12/1970 | Larson et al. |
| 3,895,686 A | 7/1975 | Savkan et al. |
| 3,960,177 A | 6/1976 | Baumann |
| 3,965,873 A | 6/1976 | Konomi et al. |
| 4,094,290 A | 6/1978 | Dismuke |
| 4,127,183 A | 11/1978 | McLarty |
| 4,137,886 A | 2/1979 | Hiramatsu |
| 4,274,386 A | 6/1981 | Reyes |
| 4,303,144 A | 12/1981 | Wirt |
| 4,333,441 A | 6/1982 | Still et al. |
| 4,463,742 A | 8/1984 | Williams |
| 4,492,212 A | 1/1985 | Dooley |
| 4,672,940 A | 6/1987 | Nakayama et al. |
| 4,691,894 A | 9/1987 | Pyötsiä et al. |
| 4,712,523 A | 12/1987 | Matsubayashi |
| 4,782,912 A | 11/1988 | Wandless |
| 4,936,413 A | 6/1990 | Lee |
| 5,010,862 A | 4/1991 | Hashimoto et al. |
| 5,113,838 A | 5/1992 | Kim |
| 5,332,872 A | 7/1994 | Ewanek |
| 5,465,756 A | 11/1995 | Royalty et al. |
| 5,571,242 A | 11/1996 | Demorest |
| 5,663,536 A | 9/1997 | Kaplan |
| 5,714,724 A | 2/1998 | Menzel |
| 5,722,357 A | 3/1998 | Choi |
| 5,962,820 A | 10/1999 | LePoutre |
| 6,024,125 A * | 2/2000 | Baumann ............... 137/625.32 |
| 6,824,119 B2 | 11/2004 | Conley et al. |

FOREIGN PATENT DOCUMENTS

| | | |
|---|---|---|
| DE | 3226453 A1 | 1/1984 |
| DE | 3720380 A1 | 12/1987 |
| DE | 3819728 A1 | 1/1989 |
| DE | 29511979 U1 | 11/1995 |
| EP | 0365892 A1 | 5/1990 |
| FR | 1213642 | 4/1960 |
| FR | 2257793 | 8/1975 |
| JP | 57070912 | 5/1982 |
| JP | 61049134 | 3/1986 |
| JP | 8128367 | 5/1996 |
| JP | 10246130 | 9/1998 |

OTHER PUBLICATIONS

Nishio and Kohama, Nippondenso Co., Ltd., Kuroda, Toyota Motor Corp., "New Approach to Low-Noise Air Intake System Development", pp. 25-37; May 1991.

Miyaji, Yoshihiro, "Air Intake Device for Internal Combustion Engine", Toyota Kokai Gazette, Apr. 26, 1996, 4 pages.

* cited by examiner

NOISE ATTENUATION FOR INTERNAL COMBUSTION ENGINE

CROSS-REFERENCE TO RELATED APPLICATIONS

This is a continuation-in-part of U.S. patent application Ser. No. 12/251,692, filed Oct. 15, 2008.

TECHNICAL FIELD

The field to which the disclosure generally relates includes internal combustion engines and ways to attenuate acoustic noises in internal combustion engines caused by air-flow.

BACKGROUND

In a fuel-injected internal combustion automobile engine, a throttle body and an intake manifold are used to guide air toward combustion chambers of the engine. A throttle valve in the throttle body is typically rotated open to let air into the intake manifold by suction caused by the combustion chambers. In some cases, a so-called air-rush noise and other noises may be heard outside of the engine, such as with sudden opening of the throttle valve, when the throttle valve is held partially open, and other instances of high suction. Such noise can also occur in engines with forced air induction, such as caused by turbochargers and superchargers.

SUMMARY OF EXEMPLARY EMBODIMENTS OF THE INVENTION

One exemplary embodiment may include a component and a structure. The component may have an air passage. The structure may extend into the air passage. The structure may have a first through-hole and a second through-hole. Each through-hole may define a cross-sectional area being tapered in a direction of air-flow traveling through the air passage. In this way, a cross-sectional area of an entrance of the respective through-hole is greater in value than a cross-sectional area of an exit of the respective through-hole. The structure may intersect a part of the total air-flow and may help attenuate acoustic noises in the component caused by the air-flow.

One exemplary embodiment may include an intake manifold and a structure. The intake manifold may have an air passage wall defining an air passage. The structure may extend from the air passage wall into the air passage and may intersect a part of a total air-flow traveling through the air passage. The structure may help attenuate acoustic noises in the intake manifold caused by the air-flow. The structure may have a first through-hole and a second through-hole. Each through-hole may define a cross-sectional area being tapered in a direction of air-flow traveling through the air passage. In this way, a cross-sectional area of an entrance of the respective through-hole is greater in value than a cross-sectional area of an exit of the respective through-hole.

One exemplary embodiment may include a throttle body and a structure. The throttle body may define an air passage therein. The structure may extend into the air passage and may intersect a part of a total air-flow traveling through the air passage. The structure may help attenuate acoustic noises in the throttle body caused by the air-flow. The structure may have a first through-hole and a second through-hole. Each through-hole may define a cross-sectional area being tapered in a direction of air-flow traveling through the air passage. In this way, a cross-sectional area of an entrance of the respective through-hole is greater in value than a cross-sectional area of an exit of the respective through-hole.

One exemplary embodiment may include an internal combustion engine and a structure. The internal combustion engine may define an air passage therein. The structure may extend into the air passage and may intersect a part of a total air-flow traveling through the air passage. The structure may help attenuate acoustic noises in the internal combustion engine caused by the air-flow. The structure may have a first through-hole and a second through-hole. Each through-hole may define a cross-sectional area being tapered in a direction of air-flow traveling through the air passage. In this way, a cross-sectional area of an entrance of the respective through-hole is greater in value than a cross-sectional area of an exit of the respective through-hole.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate an exemplary embodiment of a structure 10 designed to attenuate acoustic noise, such as air-rush and whistling noises, caused by air-flow through an intake manifold 12 or a throttle body 13 of an internal combustion engine 15 (shown schematically). Such noises may occur at transient and steady-state conditions like sudden engine acceleration, constant engine speed, and other instances of metering air-flow to the engine. The air-flow may result from suction by the combustion chambers or by forced air induction from a turbocharger or a supercharger, for example. The noise attenuation structure 10 may, in certain embodiments, minimally affect qualities of the air-flow such as velocity and pressure drop, while maintaining its stiffness and structural integrity. As an aside, and as used herein, the terms axially, radially, and circumferentially refer to directions relative to the generally cylindrical shape of an air passage of the intake manifold, so that the radial direction extends generally along any one of the imaginary radii of the cylindrical shape, the axial direction is generally parallel to a center axis of the cylindrical shape, and the circumferential direction extends generally along any one of the imaginary circumferences of the cylindrical shape. Moreover, though described in the context of an internal combustion engine, it should be appreciated that the structure 10 may be used in other applications and components where air-flow causes noise. For example, the structure 10 may be used in components where air is forced through passages with or without throttling, such as forced-air in fuel cell systems, in turbocharger systems, in super-charger systems or in automotive climate control systems. Accordingly, as used herein, the term "component" includes all such applications and components.

Figure 1:
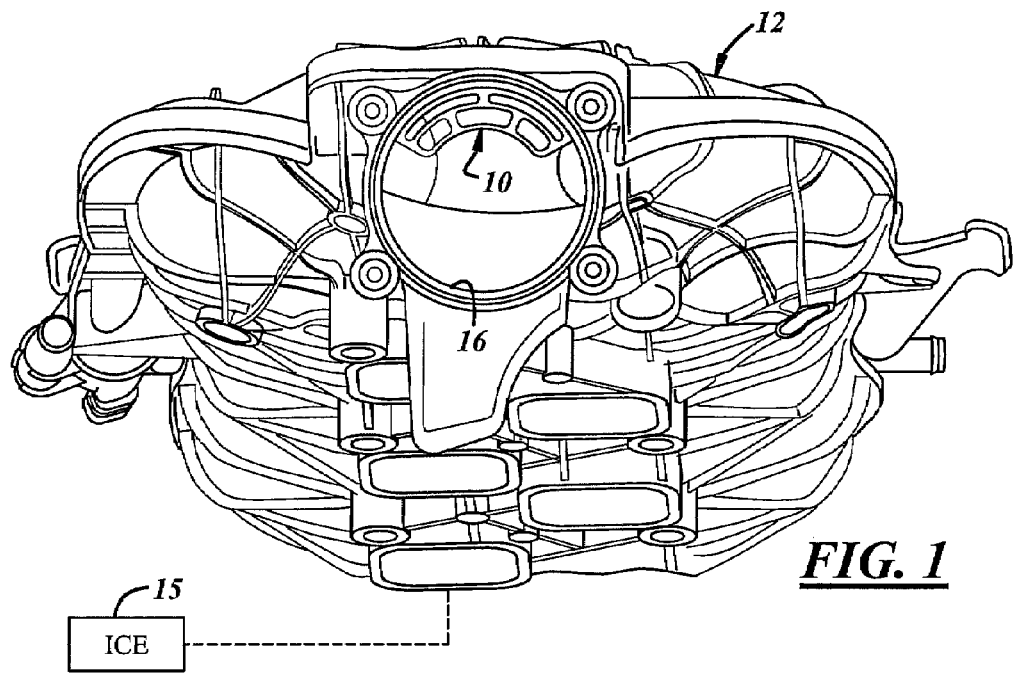
FIG. 1 is a perspective view of an exemplary embodiment of an intake manifold.
Figure 2:
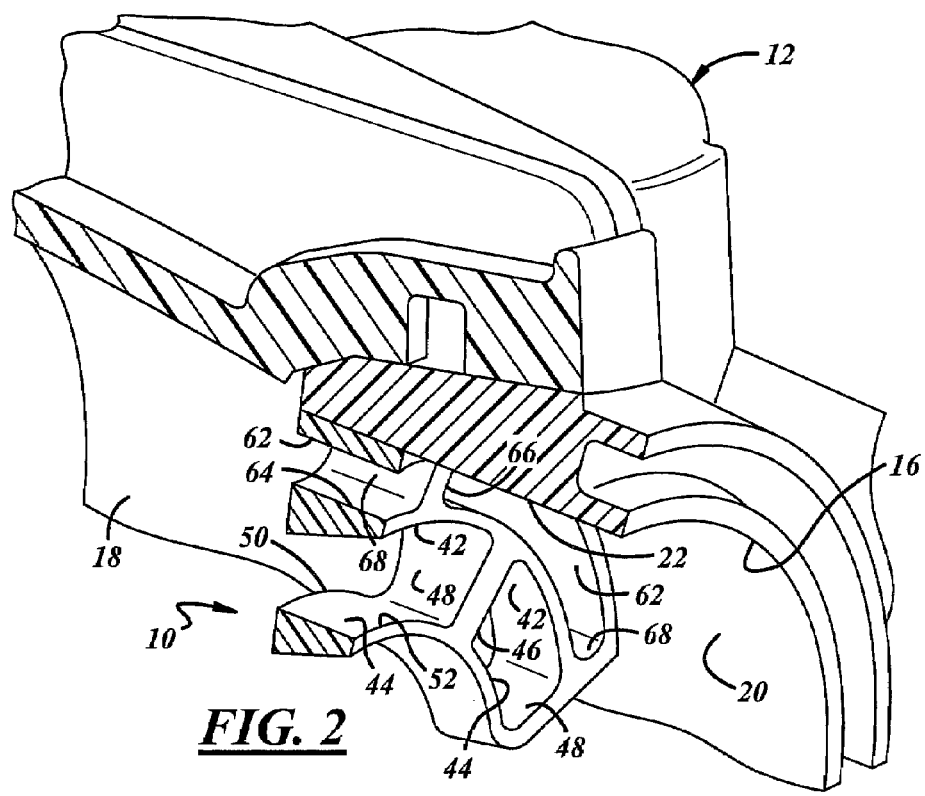
FIG. 2 is a sectioned perspective view of an exemplary embodiment of a noise attenuation structure that may be used in the intake manifold of FIG. 1.
Figure 4:
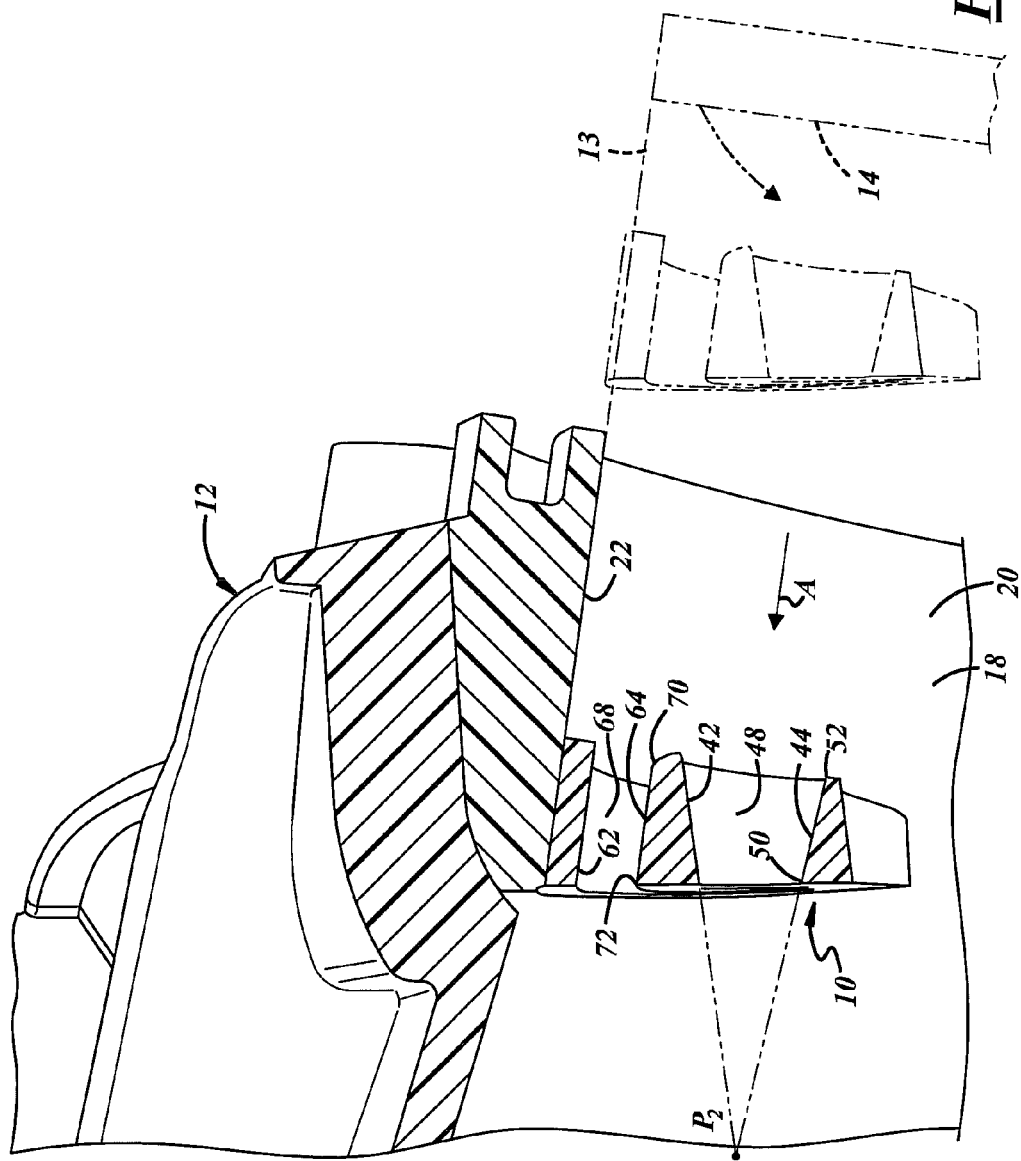
FIG. 4 is a sectioned side view of the noise attenuation structure of FIG. 2.

The intake manifold 12 may guide air downstream a throttle valve 14 (shown in phantom in FIG. 4) to one or more combustion chambers of the internal combustion engine 15. The internal combustion engine 15 may be equipped with a fuel injection system that injects fuel directly into the combustion chambers so that the throttle body 13 and the intake manifold 12 guide only air to the combustion chambers. The internal combustion engine 15 may define multiple air passages including that of the intake manifold 12, that of the throttle body 13, or that of another component. Referring to FIGS. 1 and 2, the intake manifold 12 may have an air inlet 16 that connects and seals with the throttle body 13 and that initially receives air from the throttle body. The air inlet 16 leads to an air passage 18 bounded by an air passage wall 20. The intake manifold 12 may also have an air plenum compartment communicating with the combustion chambers. In one exemplary embodiment, all or a portion of the intake manifold 12 may be made by a molding process out of a composite material like a polymer such as, but not limited to, Nylon-6. Of course, other suitable manufacturing processes and materials may be used. Furthermore, other constructions and arrangements of the intake manifold are possible that have not been shown or described. For example, intake manifolds having different shapes and geometries are possible including those with different diameters, air plenum volumes, and the like as may be required for different engines. Referring to FIG. 4, the throttle body 13 may house the throttle valve 14.

The noise attenuation structure 10 helps suppress and reduce acoustic noises caused by the air-flow in the intake manifold 12 and/or in the throttle body 13. The noise attenuation structure 10 may be made as one-piece with the intake manifold 12 or with the throttle body 13, and thus may be formed in the same manufacturing process thereof, or the noise attenuation structure may be made as a separate piece that is subsequently attached to the intake manifold or the throttle body. Like the intake manifold 12, the noise attenuation structure 10 may be made out of a composite material like a polymer such as, but not limited to, Nylon-6 or any other suitable material. The noise attenuation structure 10 may be located downstream the throttle valve 14 and slightly inboard of the air inlet 16 as shown in FIG. 4, may be located in the throttle body 13 downstream the throttle valve 14 as shown in phantom in FIG. 4, may be located on a face of the throttle valve, and may be located downstream the air plenum compartment slightly upstream an inlet of the combustion chambers. In the latter case, one noise attenuation structure 10 may be located at each combustion chamber. Of course, other locations are possible.

Figure 3:
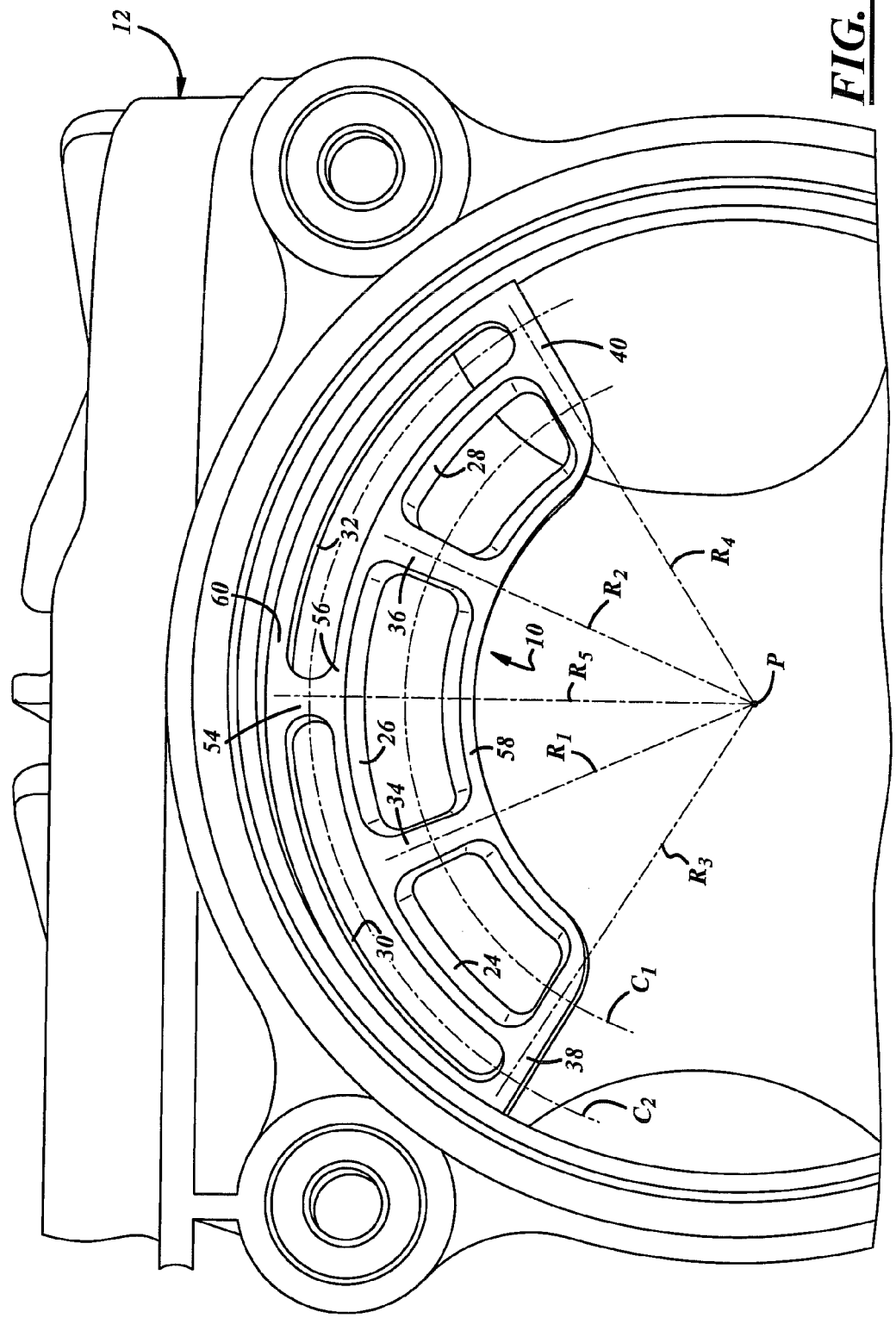
FIG. 3 is a front view of the noise attenuation structure of FIG. 2.

Referring to FIGS. 2 and 3 and taking the intake manifold location as the example in one embodiment, the noise attenuation structure 10 may extend radially from a portion of the air passage wall 20 and into the air passage 18 such that the noise attenuation structure intersects only a part of the total air-flow traveling through the air passage. For example, the noise attenuation structure 10 may extend from an upper portion 22 of the air passage wall 20. The noise attenuation structure 10 may protrude into the air passage 18 a set distance which is less than a measured radius of the air passage. Circumferentially, the noise attenuation structure 10 may span about one-third of a total measured circumference of the air passage wall 20, or 120° out of a total 360°. And axially, the noise attenuation structure 10 may have a length ranging from about 2 to about 11 millimeters, and in one embodiment of about 5 millimeters. In one exemplary embodiment, the noise attenuation structure 10 may have a first slot or through-hole 24, a second slot or through-hole 26, a third slot or through-hole 28, a fourth slot or through-hole 30, and a fifth slot or through-hole 32.

In select embodiments, the noise attenuation structure 10 may include a first arcuate shaped slot or through-hole and a second arcuate shaped slot or through-hole. Here, the first and second through-holes may lie along a common imaginary circumference generally through the center of the through-holes. In another embodiment, the first and second arcuate shaped through-holes may be concentrically positioned, being formed along radii having a common centerpoint. In yet another embodiment, the noise attenuation structure may include a number of concentric tapered arcuate shaped slots or through-holes, where the noise attenuation structure extends across the entire diameter of the air passage in which the structure is located.

Referring to FIG. 3, the first, second, and third through-holes 24, 26, 28 may each lie along a part of a first imaginary circumference $C_1$ that may be concentric with an imaginary circumference of the air passage 18. Each through-hole may be circumferentially offset and separated from a neighboring through-hole by a lateral connector. For example, a first lateral connector 34 may separate the first and second through-hole 24, 26, and a second lateral connector 36 may separate the second and third through-hole 26, 28. The first and second lateral connectors 34, 36 may be angled toward a centerpoint P of the air passage 18, whereby the first lateral connector 34 lies along a first imaginary radial line $R_1$ and the second lateral connector 36 lies along a second imaginary radial line $R_2$. The first and second imaginary radial lines $R_1$, $R_2$ may converge at the centerpoint P. Likewise, a pair of outer lateral connectors 38, 40 may lie along a third imaginary radial line $R_3$ and a fourth imaginary radial line $R_4$, respectively, that are angled toward the centerpoint P. The different lateral connectors need not be equally spaced with respect to each other.

Each of the first, second, and third through-holes 24, 26, 28 may have similar elongated oval shapes bent along the first imaginary circumference $C_1$. Referring to FIGS. 2 and 4, each of the through-holes may have a top wall 42, a bottom wall 44, a first side wall 46, and a second side wall 48. The top and bottom walls 42, 44 may be slanted toward each other and, when extended by imaginary line, may converge at a point $P_2$ located downstream an exit 50 of the through-holes. Put another way, the through-holes may taper or grow narrower in cross-sectional area from an entrance 52 to the exit 50. A cross-sectional area measured at the entrance 52 may have a greater value than a cross-sectional area measured at the exit 50. The cross-sectional area may taper continuously in a general direction of air-flow A from the entrance 52 to the exit 50.

In different embodiments, the top and bottom walls 42, 44 may be slanted at similar angles with respect to each other, may be slanted at different angles with respect to each other, and may be slanted at different angles than shown in the figures. Still in other embodiments, the top and bottom walls 42, 44 need not be continuously tapered from the entrance 52 to the exit 50, and instead a portion between the entrance and the exit may be uniform in diameter for a set distance, for example. The first and second side walls 46 and 48 may be generally parallel and aligned with the direction of air-flow A.

When manufactured by a molding process, the first and second side walls 46, 48 may be slightly slanted toward each other to provide a suitable amount of draft for removing the part out of a molding die.

Referring to FIG. 3, the fourth and fifth through-holes 30, 32 may be radially offset from the first, second, and third through-holes 24, 26, 28, and may each lie along a part of a second imaginary circumference $C_2$ that may be concentric with the imaginary circumference of the air passage 18. The fourth and fifth through-holes 30, 32 may be circumferentially offset and separated from one another by a third lateral connector 54 that may lie along a fifth imaginary radial line $R_5$. The fourth and fifth through-holes 30, 32 may be separated from the first, second, and third through-holes 24, 26, 28 by a first longitudinal connector 56 that may be concentric with the imaginary circumference of the air passage 18. A second longitudinal connector 58 may define the radially innermost boundary of the noise attenuation structure 10, and a third longitudinal connector 60 may define the radially outermost boundary of the noise attenuation structure. Both the second and third longitudinal connectors 58, 60 may be concentric with the imaginary circumference of the air passage 18.

Each of the fourth and fifth through-holes 30, 32 may have similar elongated oval shapes bent along the second imaginary circumference $C_2$. Referring to FIGS. 2 and 4, each of the through-holes may have a top wall 62, a bottom wall 64, a first side wall 66, and a second side wall 68. All of the walls may be generally parallel and aligned with the direction of air-flow A. The fourth and fifth through-holes 30, 32 may each have a cross-sectional area that is uniform, or constant, from an entrance 70 to an exit 72. In cross-section as shown in FIG. 4, the top and bottom walls 62, 64 may be parallel with respect to each other and may be nonparallel with respect to the top and bottom walls 42, 44 of the first, second, and third through-holes 24, 26, 28. The top and bottom walls 62, 64 may also be parallel with the adjacent cross-sectional surface of the upper portion 22. When manufactured by a molding process, the top, bottom, first side, and second side walls 62, 64, 66, 68 may be slightly slanted toward each other from the entrance 70 to the exit 72, to provide a suitable amount of draft for removing the part out of a molding die.

Still other embodiments of the noise attenuation structure 10 are possible. For instance, the noise attenuation structure 10 may not necessarily have the exact number of through-holes as shown, and instead may have more or less through-holes. As one example, a first and second through-hole may lie along a first imaginary circumference $C_1$, while a third through-hole may lie along the second imaginary circumference $C_2$. Moreover, four through-holes may lie along the first imaginary circumference $C_1$, while three through-holes may lie along the second imaginary circumference $C_2$.

In another embodiment, a plate having a bore formed therethrough may be bolted between the intake manifold 12 and the throttle body 13. The noise attenuation structure 10 may extend from a bore wall of the plate. In yet another embodiment, the noise attenuation structure 10 may extend from a tab bolted to or between the intake manifold 12 and the throttle body 13, or the tab may be frictionally received or locked to the intake manifold and/or the throttle body. And in another embodiment, the noise attenuation structure 10 may extend from a ring or partial ring structure received in the intake manifold 12 and/or the throttle body 13.

In use, the noise attenuation structure 10 suppresses acoustic noise caused by the air-flow in the intake manifold 12. For example, referring to FIG. 4, as the throttle valve 14 begins to open, air-flow rushes through the air passage 18 and through the noise attenuation structure 10. Air-flow may travel through all of the first, second, third, fourth, and fifth through-holes 24, 26, 28, 30, 32, and the noise attenuation structure 10 may slightly slow the velocity of air-flow upon the opening of the throttle valve 14. The air-flow that funnels through the first, second, and third through-holes 24, 26, 28 may be directed away from the upper portion 22 upon exiting the through-holes. Furthermore, one theory suggests that the noise attenuation structure 10 may reduce turbulence in the air-flow, thus reducing noise, while another theory suggests that the noise attenuation structure may cause turbulence in the air-flow, thus reducing noise. The noise attenuation structure 10 may perform one or more of the above functions to reduce noise, or may perform one or more different functions not mentioned to reduce noise.

The above description of embodiments of the invention is merely exemplary in nature and, thus, variations thereof are not to be regarded as a departure from the spirit and scope of the invention.

What is claimed is:

1. A combustion engine intake manifold comprising:
a body having an air passage wall defining an air passage; and
a structure partially extending from a portion of the air passage wall into the air passage and intersecting a part of a total air-flow through the air passage, the structure attenuating acoustic noise in the intake manifold caused by the air-flow, the structure comprising at least a first and a second through-hole, each of the first and second through-holes defining a cross-sectional area being tapered in a direction of air-flow through the air passage so that a cross-sectional area of an entrance of the through-hole is greater than a cross-sectional area of an exit of the through-hole.

2. A combustion engine throttle body comprising:
a body defining an air passage therein; and
a structure partially extending into the air passage and intersecting a part of a total air-flow through the air passage, the structure attenuating acoustic noise in the throttle body caused by the air-flow, the structure comprising at least a first and a second through-hole, each of the first and second through-holes defining a cross-sectional area being tapered in a direction of air-flow through the air passage so that a cross-sectional area of an entrance of the through-hole is greater than a cross-sectional area of an exit of the through-hole.

3. An internal combustion engine comprising:
a body defining an air passage therein; and
a structure partially extending into the air passage and intersecting a part of a total air-flow through the air passage, the structure attenuating acoustic noise in the internal combustion engine caused by the air-flow, the structure comprising at least a first and a second through-hole, each of the first and second through-holes defining a cross-sectional area being tapered in a direction of air-flow through the air passage so that a cross-sectional area of an entrance of the through-hole is greater than a cross-sectional area of an exit of the through-hole.

* * * * *